(No Model.)
W. H. IVERS.
BOXING THIMBLE FOR PACKING FURNITURE.
No. 462,257. Patented Nov. 3, 1891.
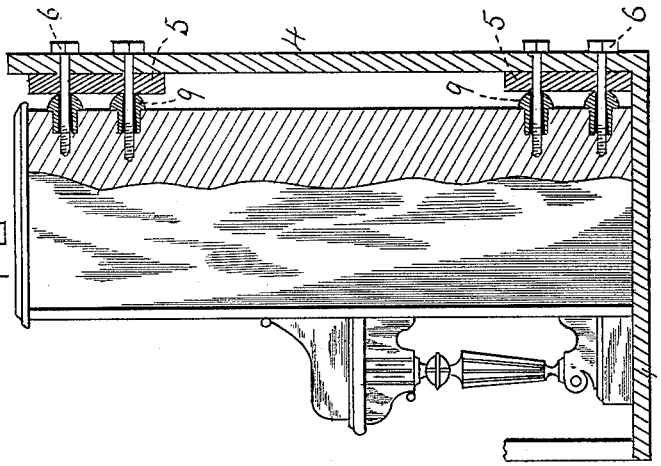
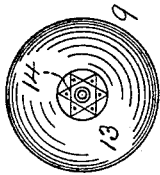
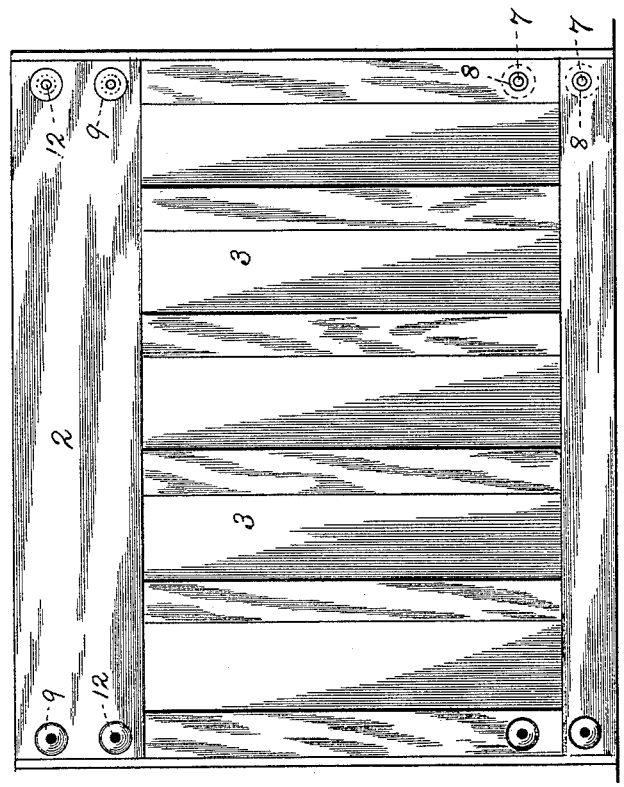
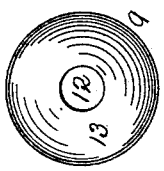
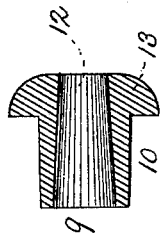
Witnesses.
Richard W. Lodge
John A. Dougherty
Inventor.
William H. Ivers.
by H. E. Lodge Atty.

UNITED STATES PATENT OFFICE.

WILLIAM H. IVERS, OF DEDHAM, ASSIGNOR TO THE IVERS AND POND PIANO COMPANY, OF BOSTON, MASSACHUSETTS.

BOXING-THIMBLE FOR PACKING FURNITURE.

SPECIFICATION forming part of Letters Patent No. 462,257, dated November 3, 1891.

Application filed June 29, 1891. Serial No. 397,876. (No model.)

*To all whom it may concern:*

Be it known that I, WILLIAM H. IVERS, a citizen of the United States, residing at Dedham, in the county of Suffolk and State of Massachusetts, have invented certain new and useful Improvements in Boxing-Thimbles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention consists of a boxing-thimble or guard, such that it shall serve to protect the polished surface of piano-fortes, furniture, or heavy articles of any description when occasion requires their transfer from one place to another within a packing-box or casing, and, further, such that it shall subsequently act as an ornament and conceal a bolt or screw hole. Briefly stated, this boxing-thimble embodying my invention consists in a short metallic stem or section of a tube having a smooth bore and an enlarged head, which shall project above the surface of the article to which it is attached, the bore being a continuation of the bolt or screw hole, while the head serves to conceal the edge of the hole where it enters the article. The mode of application and function of this thimble will be more fully hereinafter described.

The drawings herewith presented represent, in Figure 1, a vertical longitudinal section; Fig. 2, a front end view of a boxing-thimble embodying my invention. Fig. 3 represents the same with an ornamental plug within the bore. Fig. 4 is a rear elevation of an upright piano with said packing-thimble attached. Fig. 5 is a side elevation of the same, showing the packing-case in section.

In the transportation of piano-fortes, furniture, or other articles which have a high exterior finish or polish and which require a packing-case during transportation it frequently is necessary to bolt the article and case together. This insertion of a bolt, even if the hole be subsequently filled up, produces a disfigurement. On the other hand, unless packing in the nature of cloth, paper, or other soft material is interposed between the article and the packing-case, chafing occurs.

The object of my invention—a boxing-thimble or guard—is to have such thimble serve both purposes, not only to act as an ornamentation and conceal the hole where the bolt enters, but, further, to serve as a fender or guard to prevent any part of the packing-case from touching the piano or other article to be shipped. In the present instance I have shown the thimble as applied to an upright piano, to which it is peculiarly applicable. It is desirable that the back of the piano have as high a finish as the front, top, or end portion, obviously that the instrument may face outwardly in the room, in which event the back is exposed to view.

In Fig. 4 I have represented the back of an upright piano at 2 with a series of vertical panels 3 and presumably with a high polish or surface finish. The packing-box (shown sectionally at 4) is of a size slightly larger than the dimensions of the piano. To fill the space which would otherwise exist between the packing-case and the instrument, blocks or strips 5 are interposed. Said strips may be bolted to the instrument previously or held in place by single bolts 6 6, which pass through said blocks, the packing-case, and into the instrument. Preferably, however, these blocks or strips are separately fastened to the article, which is then entered within the packing-box, while other bolts unite said strips and the box during shipment.

In Fig. 4 there are two bolts to be entered at each corner of the instrument, which is bored to create the bolt-holes 7 7. The outer portions of said holes, or those nearest the surface, are enlarged at 8 to receive that part of the thimble which enters the substance of the piano or other article.

Fig. 1 shows a packing-thimble 9, embodying my invention and composed of a body portion 10 or tubular stem having a smooth bore 12, of a size to admit the bolt, and, in fact, a continuation of the bolt-hole, while an enlarged portion or head 13 projects above the surface where the bolt enters. Thus after boring the holes in the article to be packed and enlarging said holes at or near the surface the thimbles are inserted and driven home—that is, until the under side or projecting part of the head contacts against the surface of the article, the depth of said enlarged portion 8 being sufficient to permit this. The packing-strips may now be applied by resting them on the thimbles or guards and screwing the bolts 6 in place. Thus it will be seen that no part of the highly-finished surface contacts with any portion of the packing-strips or the box, since the heads of the thimbles projecting beyond and above such surface prevents such contact—hence no chafing. On the other hand, when the article has reached its destination the packing-box is removed and the bolts withdrawn, leaving the thimbles or guards in their original positions. The length of the stem or body is such that the hole in the wood does not show, but only a black spot or metal interior of the thimble-bore. However, if it is desired, a metallic plug 14, having a closed or ornamented end, may be inserted. (See Fig. 3.) In some instances pins may be introduced to act as supports for a piece of tapestry or other ornamental textile fabric. In any event the thimbles act as ornaments to conceal the bolt-holes and the disfigurement at points where such holes are placed. Further, during transportation they guard the entire surface from chafing or scratching. Moreover, they are readily made and easily inserted, while they enable the act of packing to be quickly, easily, and effectually performed.

What I claim is—

In combination with a packing-box or packing-strips and an article to be inclosed, a tubular boxing thimble or guard adapted to be inserted within said article and project therefrom, and packing-bolts which unite the packing box or strips passing through the thimble, substantially as specified.

In testimony whereof I affix my signature in presence of two witnesses.

WILLIAM H. IVERS.

Witnesses:
H. E. LODGE,
JOHN A. DOUGHERTY.